(12) United States Patent
Yoda (10) Patent No.: US 8,302,716 B2
(45) Date of Patent: Nov. 6, 2012

(54) STRUCTURE FOR INSTALLING ELECTRICAL PART

(75) Inventor: Takehito Yoda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 762 days.

(21) Appl. No.: 11/991,470

(22) PCT Filed: Oct. 11, 2006

(86) PCT No.: PCT/JP2006/320693
§ 371 (c)(1),
(2), (4) Date: Mar. 5, 2008

(87) PCT Pub. No.: WO2007/043692
PCT Pub. Date: Apr. 19, 2007

(65) Prior Publication Data
US 2009/0120702 A1 May 14, 2009

(30) Foreign Application Priority Data
Oct. 13, 2005 (JP) ................................. 2005-298871

(51) Int. Cl.
*B60R 16/04* (2006.01)

(52) U.S. Cl. ..................................................... 180/68.5

(58) Field of Classification Search .................. 180/68.1, 180/68.2, 68.5
See application file for complete search history.

(56) References Cited

U.S. PATENT DOCUMENTS

| | | | | |
|---|---|---|---|---|
| 2,031,508 A | * | 2/1936 | Scott | 180/68.5 |
| 3,003,573 A | * | 10/1961 | Lorenz | 180/68.5 |
| 3,930,552 A | * | 1/1976 | Kunkle et al. | 180/68.5 |
| 4,883,725 A | * | 11/1989 | Gerard | 429/99 |
| 5,037,154 A | * | 8/1991 | Senba et al. | 296/37.16 |
| 5,558,949 A | * | 9/1996 | Iwatsuki et al. | 429/99 |
| 5,585,205 A | * | 12/1996 | Kohchi | 429/99 |
| 6,220,383 B1 | | 4/2001 | Muraki et al. | |
| 6,298,750 B1 | | 10/2001 | Kerner et al. | |
| 6,632,560 B1 | * | 10/2003 | Zhou et al. | 429/99 |
| 6,783,886 B1 | | 8/2004 | Sakakibara et al. | |
| 2003/0098191 A1 | | 5/2003 | Takedomi et al. | |
| 2005/0056474 A1 | * | 3/2005 | Damon | 180/68.5 |
| 2005/0133206 A1 | * | 6/2005 | Scott | 165/122 |

FOREIGN PATENT DOCUMENTS

| | | |
|---|---|---|
| EP | 0 594 510 A | 4/1994 |
| JP | 2-123064 | 10/1990 |
| JP | 10-223189 | 8/1998 |
| JP | 2000-100481 | 4/2000 |
| JP | 2001-203004 A | 7/2001 |
| JP | 2002-008614 | 1/2002 |
| JP | 2003-165398 A | 6/2003 |
| JP | 2004-327142 | 11/2004 |

* cited by examiner

*Primary Examiner* — Frank Vanaman
(74) *Attorney, Agent, or Firm* — Kenyon & Kenyon LLP (57) ABSTRACT

A structure for installing a fan as an electrical part includes a battery case having a top surface and provided to a vehicle, and a battery cooling fan installed at a prescribed position on the top surface. The battery case and the battery cooling fan have a guide, grooves and guides which guide the battery cooling fan toward the prescribed position while the battery cooling fan is slid on the top surface. By such a configuration, the structure for installing the electrical part with good workability at the time of installation is provided.

9 Claims, 7 Drawing Sheets

STRUCTURE FOR INSTALLING ELECTRICAL PART

This is a 371 national phase application of PCT/JP2006/320693 filed 11 Oct. 2006, claiming priority to Japanese Patent Application No. 2005-298871 filed 13 Oct. 2005, the contents of which are incorporated herein by reference.

TECHNICAL FIELD

The present invention generally relates to a structure for installing an electrical part, and more particularly to a structure for installing a fan to be mounted on a vehicle.

BACKGROUND ART

With reference to a conventional structure for installing an electrical part, for example, Japanese Patent Laying-Open No. 2000-100481 discloses a battery box for an electric vehicle which is aimed at making space efficiency compatible with cooling efficiency. According to this patent document, a cooling fan housed in a fan cover is provided on the upper surface of a battery housing chamber.

Japanese Patent Laying-Open No. 2002-008614 discloses a gas inflation preventing device which is aimed at adequately discharging hydrogen gas generated in the interior of a battery housing room. According to this patent document, a blower fan is placed on the lower surface of a battery hood. Furthermore, Japanese Patent Laying-Open No. 2004-327142 discloses a cooling device of a battery set which is aimed at effectively suppressing noise without causing reduction of its cooling performance as well as possible failure and breakage. According to this patent document, a cross-flow type fan is disposed on an upper case which houses secondary batteries.

According to the above-described patent documents, batteries with various fans are mounted on vehicles such as electric vehicles, forklifts or the like. On these vehicles, however, only a very narrow space for mounting batteries is allowed. Therefore, the operation of moving the fans to a mounting position on the vehicles at the time of installing the fans may be difficult in some cases.

DISCLOSURE OF THE INVENTION

To solve the above-described problems, an object of the present invention is to provide a structure for installing an electrical part with good workability at the time of installation.

A structure for installing an electrical part according to the present invention includes an installation portion having a surface and provided to a vehicle, and an electrical part installed at a prescribed position on the surface. At least one of the installation portion and the electrical part has a guide member which guides the electrical part toward the prescribed position while the electrical part is slid on the surface.

According to the structure for installing the electrical part configured in the above-described manner, the guide member allows the electrical part to be easily arranged at the prescribed position when the electrical part is installed on the installation portion. This can bring about an improvement in the workability at the installation of the electrical part.

Preferably, the guide member includes a groove formed in one of the installation portion and the electrical part, and a protrusion formed in the other of the installation portion and the electrical part to fit into the groove. According to the structure for installing the electrical part configured in the above-described manner, the fit between the groove and the protrusion allows the electrical part to be guided toward the prescribed position.

The installation portion is a housing of an electric storage device mounted on the vehicle. Preferably, the housing is reinforced with one of the groove and the protrusion formed in the installation portion. According to the structure for installing the electrical part configured in the above-described manner, the groove and the protrusion provided for reinforcement of the housing can be utilized as the guide member.

Preferably, the guide member includes a first guide portion guiding the electrical part toward the prescribed position along the horizontal direction, and a second guide portion guiding the electrical part toward the prescribed position along the vertical direction. According to the structure for installing the electrical part configured in the above-described manner, the first and second guide portions allow the electrical part to be more easily and precisely arranged at the prescribed position.

Preferably, the guide member has no contact between the installation portion and the electrical part when the electrical part is installed at the prescribed position. According to the structure for installing the electrical part configured in the above-described manner, vibration transmission via the guide member can be prevented between the installation portion and the electrical part.

The installation portion has a receiving portion. The electrical part has an inserting portion. Preferably, the receiving portion and the inserting portion are fit on each other by sliding the electrical part on the surface. According to the structure for installing the electrical part configured in the above-described manner, the electrical part guided to the prescribed position by the guide member can be easily fixed to the installation portion by means of the fit between the receiving portion and the inserting portion. This can bring about further improvement in the workability at the installation of the electrical part.

The electrical part is a fan. According to the structure for installing the electrical part configured in the above-described manner, the workability at the installation of the fan can be improved.

The installation portion is a housing of an electric storage device mounted in a luggage room. The electrical part is a fan by which cooling air is fed into the electric storage device. The fan is fixed to the housing by being carried in from an opening of the luggage room which is open to the backward and forward direction of the vehicle, and being slid in the backward and forward direction of the vehicle. According to the structure for installing the electrical part configured in the above-described manner, the workability at the installation of the fan can be improved even if the fan is installed on the housing of the electric storage device within a limited space in the luggage room.

As described above, according to the present invention, the structure for installing the electrical part with good workability at the time of installation can be provided.

BEST MODES FOR CARRYING OUT THE INVENTION

The embodiments of the present invention will be described with reference to the drawings. The same or corresponding components are represented by the same reference numerals in the drawings referenced below.

First Embodiment

Figure 1:
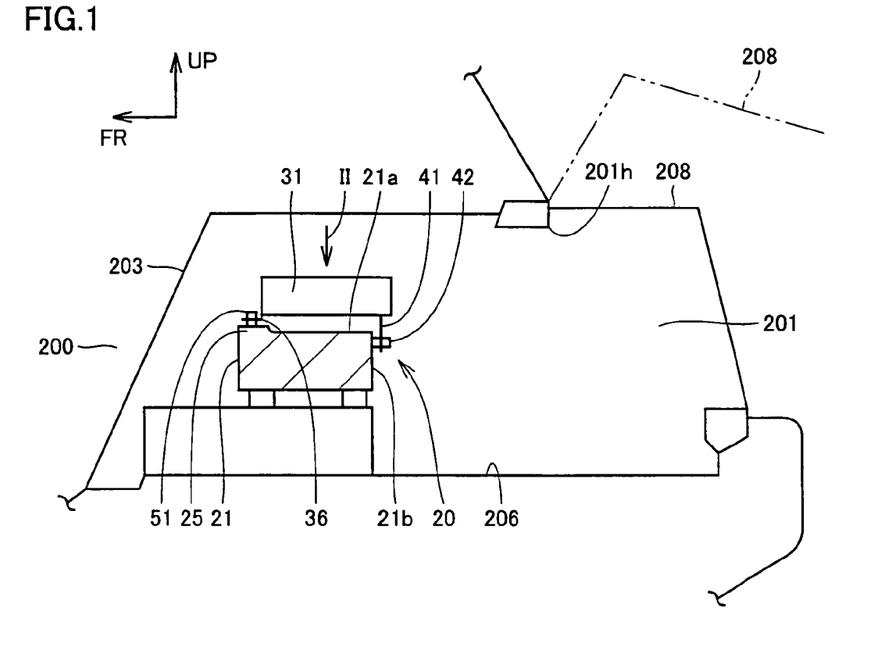
FIG. 1 is a cross-sectional view of a vehicle to which a structure for installing a fan according to a first embodiment of the present invention is applied.

FIG. 1 is a cross-sectional view of a vehicle to which a structure for installing a fan according to a first embodiment of the present invention is applied. FIG. 1 shows a cross section of a luggage room located at the rear of the vehicle. The vehicle shown in FIG. 1 is a hybrid vehicle powered by an internal combustion engine such as a gasoline engine, a diesel engine or the like, as well as a chargeable and dischargeable secondary battery such as a lithium-ion battery, nickel metal hydride battery or the like.

Referring to FIG. 1, the hybrid vehicle is a FR (Front engine Rear wheel drive) car. The hybrid vehicle includes a vehicle cabin 200 and a luggage room 201 located at the rear of the vehicle and equipped with a battery pack 20. Luggage room 201 is partitioned from vehicle cabin 200 by a partition panel 203. To the rear end of the hybrid vehicle, a luggage room door 208 which can be opened and closed freely is provided. Through luggage room door 208, luggage can be loaded into luggage room 201. By opening luggage room door 208, the rear of luggage room 201 opens to form an opening 201h.

Figure 2:
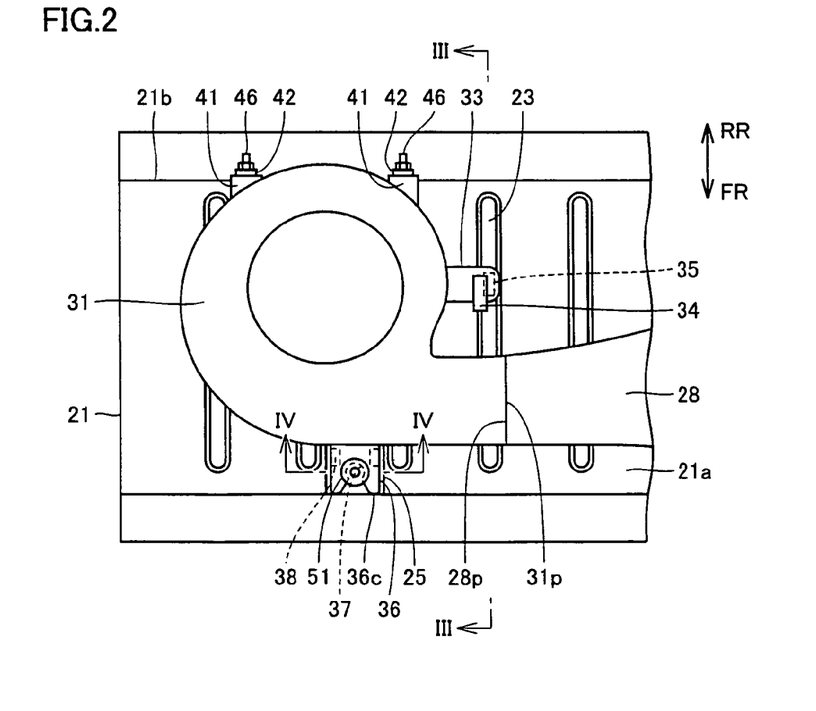
FIG. 2 is a plan view of a battery pack as seen from the direction shown by an arrow II in FIG. 1.
Figure 3:
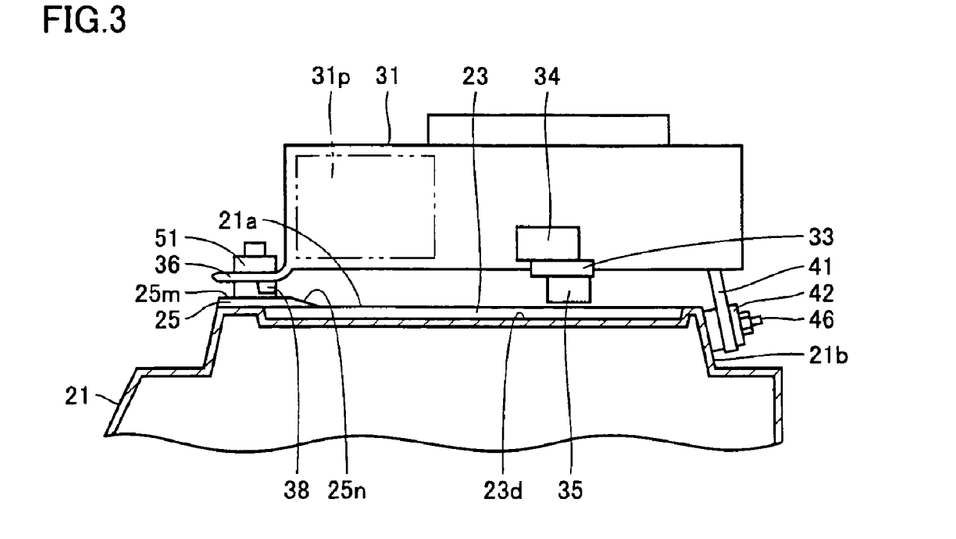
FIG. 3 is a cross-sectional view of the battery pack taken along the line III-III in FIG. 2.

FIG. 2 is a plan view of the battery pack as seen from the direction shown by an arrow II in FIG. 1. FIG. 3 is a cross-sectional view of the battery pack taken along the line III-III in FIG. 2.

Referring to FIGS. 1 to 3, battery pack 20 includes a battery case 21 which houses a secondary battery qualified as an electric storage device, and a battery cooling fan 31 by which cooling air is fed into battery case 21 through an intake duct 28. Battery case 21 is placed on a floor 206 of luggage room 201. Battery case 21 is formed in a substantially rectangular parallelepiped shape having a longitudinal direction and a lateral direction as the vehicle is seen in a plan view. Battery case 21 is placed so that the lateral direction corresponds approximately with the backward and forward direction of the vehicle and the longitudinal direction corresponds approximately with the width direction of the vehicle.

Battery case 21 has a top surface 21a facing in the vertically upward direction, and a back surface 21b facing towards the back of the vehicle. Back surface 21b faces opening 201h. Battery cooling fan 31 is arranged on top surface 21a. In the present embodiment, a sirocco fan is used as battery cooling fan 31. Battery cooling fan 31 has an opening 31p through which cooling air is fed. Intake duct 28 has an opening 28p into which the cooling air fed from battery cooling fan 31 flows. Battery cooling fan 31 is provided so that opening 31p communicates with opening 28p. A case body forming the contour of battery cooling fan 31 is made from, for example, resin.

It should be noted that battery cooling fan 31 may be any fan other than a sirocco fan. For example, it may be a cross-flow type fan or a propeller fan. The case body forming the contour of battery cooling fan 31 may be made from metal. Battery cooling fan 31 may be provided on any surface of battery case 21 other than top surface 21a. For example, it may be provided on the surface facing in the substantially horizontal direction or on the surface facing in the vertically downward direction.

A rubber mount 51 qualified as a receiving portion is fixed to battery case 21. Rubber mount 51 is arranged on the front side of the vehicle on top surface 21a. Battery cooling fan 31 has a stay 36 qualified as an inserting portion. Stay 36 may be integrally formed at the case body forming the contour of battery cooling fan 31, or may be provided as a separate component from the case body. Stay 36 is fixed to rubber mount 51.

Stud bolts 46 are fixed to battery case Stud bolts 46 are arranged at two points spaced apart in the width direction of the vehicle on back surface 21b. Stud bolts 46 project from battery case 21 toward opening 201h. Stud bolts 46 are arranged on the more rear side of the vehicle than rubber mount 51. Battery cooling fan 31 has stays 41. Stays 41 are fixed to stud bolts 46 via rubber mounts 42.

By such a configuration, battery cooling fan 31 is installed on battery case 21 via rubber mounts 51 and 42 in a position where it is spaced apart in the vertically upward direction from top surface 21a. Battery cooling fan 31 is provided without contacting battery case 21. By means of rubber mounts 51 and 42, battery cooling fan 31 is supported at three points which are not aligned. In the present embodiment, rubber mounts 51 and 42 are provided to prevent vibration generated at battery cooling fan 31 as a vibration source from being transmitted to the main body of the vehicle.

Grooves 23 recessed from top surface 21a are formed in battery case 21. Grooves 23 extend in the backward and forward direction of the vehicle. A plurality of grooves 23 are formed with a spacing therebetween in the width direction of the vehicle. Battery case 21 is reinforced with grooves 23. It should be noted that grooves 23 may extend obliquely relative to the backward and forward direction of the vehicle. Grooves 23 may extend in such a manner that they curve in the middle of grooves 23. Grooves 23 recessed from top surface 21a may have rectangular, semicircular, or trapezoidal shapes, or may have any other shapes.

Battery case 21 has a mount portion 25. Mount portion 25 is formed so that it projects from top surface 21a. Mount portion 25 is formed on the front side of the vehicle on top surface 21a. Mount portion 25 has a top surface 25m extending in a position where it is spaced apart from top surface 21a in the vertically upward direction, and an oblique surface 25n extending from top surface 25m toward top surface 21a. Rubber mount 51 is placed on top surface 25m. Mount portion 25 is provided as a platform for attaching rubber mount 51.

Battery cooling fan 31 has a stay 33. Stay 33 is equipped with a connector 34 to which wiring or the like extending from a power source is connected. A guide 35 qualified as a protrusion is formed at stay 33. When battery cooling fan 31 is installed on battery case 21, guide 35 projects from stay 33 toward top surface 21a. Guide 35 is formed over groove 23. Guide 35 is formed in a position where guide 35 and groove 23 overlap each other as the vehicle is seen in a plan view. Guide 35 is formed in a position where it is spaced apart in the vertically upward direction from the bottom surface 23d of groove 23. Guide 35 is provided without contacting battery case 21.

Guides 38 are formed at stay 36. When battery cooling fan 31 is installed on battery case 21, guides 38 project from stay 36 toward top surface 25m. Guides 38 are formed in a position where guides 38 and mount portion 25 overlap each other as the vehicle is seen in a plan view. Guides 38 are formed in a position where they are spaced apart in the vertically upward direction from top surface 25m. Guides 38 are provided without contacting battery case 21.

It should be noted that guides 35 and 38 may be integrally formed with stays 33 and 36 respectively, or may be formed of a separate component from stays 33 and 36. Guides 35 and 38 may respectively be formed at a plurality of points.

Figure 4:
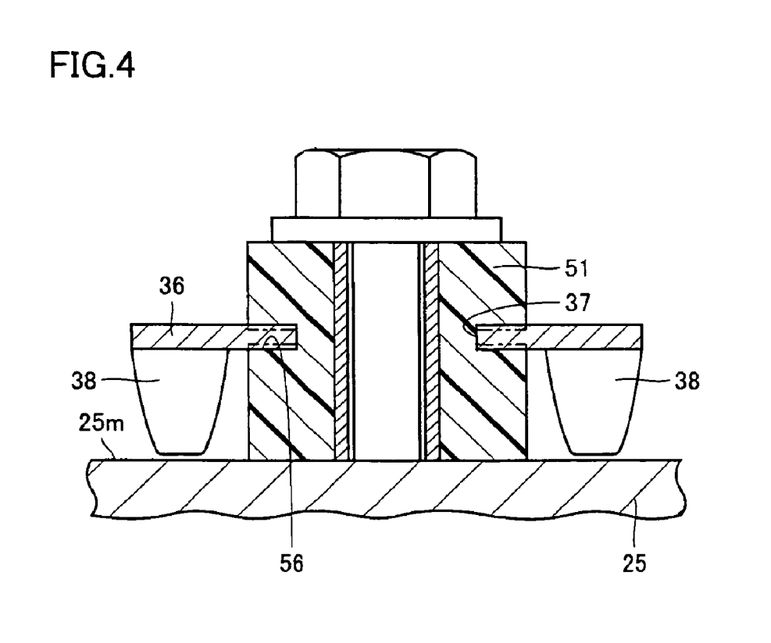
FIG. 4 is a cross-sectional view of the battery pack taken along the line IV-IV in FIG. 2.

FIG. 4 is a cross-sectional view of the battery pack taken along the line IV-IV in FIG. 2. Referring to FIGS. 2 and 4, stay 36 has an end 36c located towards the front of the vehicle when stay 36 is fixed to rubber mount 51. Stay 36 has a hole for placing the rubber mount 37 qualified as a hole which is open to the side of end 36c. Rubber mount 51 is fixed to stay 36 by being positioned in the hole for placing the rubber mount 37.

Rubber mount 51 is made from an elastic member such as synthetic rubber or the like. A groove 56 is shaped in rubber mount 51. When rubber mount 51 is positioned in the hole for placing the rubber mount 37, stay 36 fits into groove 56. The surface of groove 56 is then pressed by stay 36 and elastically compressed. That is, stay 36 is pressed into groove 56 of rubber mount 51. By such a configuration, stay 36 is held in the hole for placing the rubber mount 37 by means of the elastic force of rubber mount 51.

The procedure for installing battery cooling fan 31 on battery case 21 will be described hereinafter. In the present embodiment, battery case 21 is placed in luggage room 201 shown in FIG. 1, and then battery cooling fan 31 is installed on battery case 21.

Figure 5:
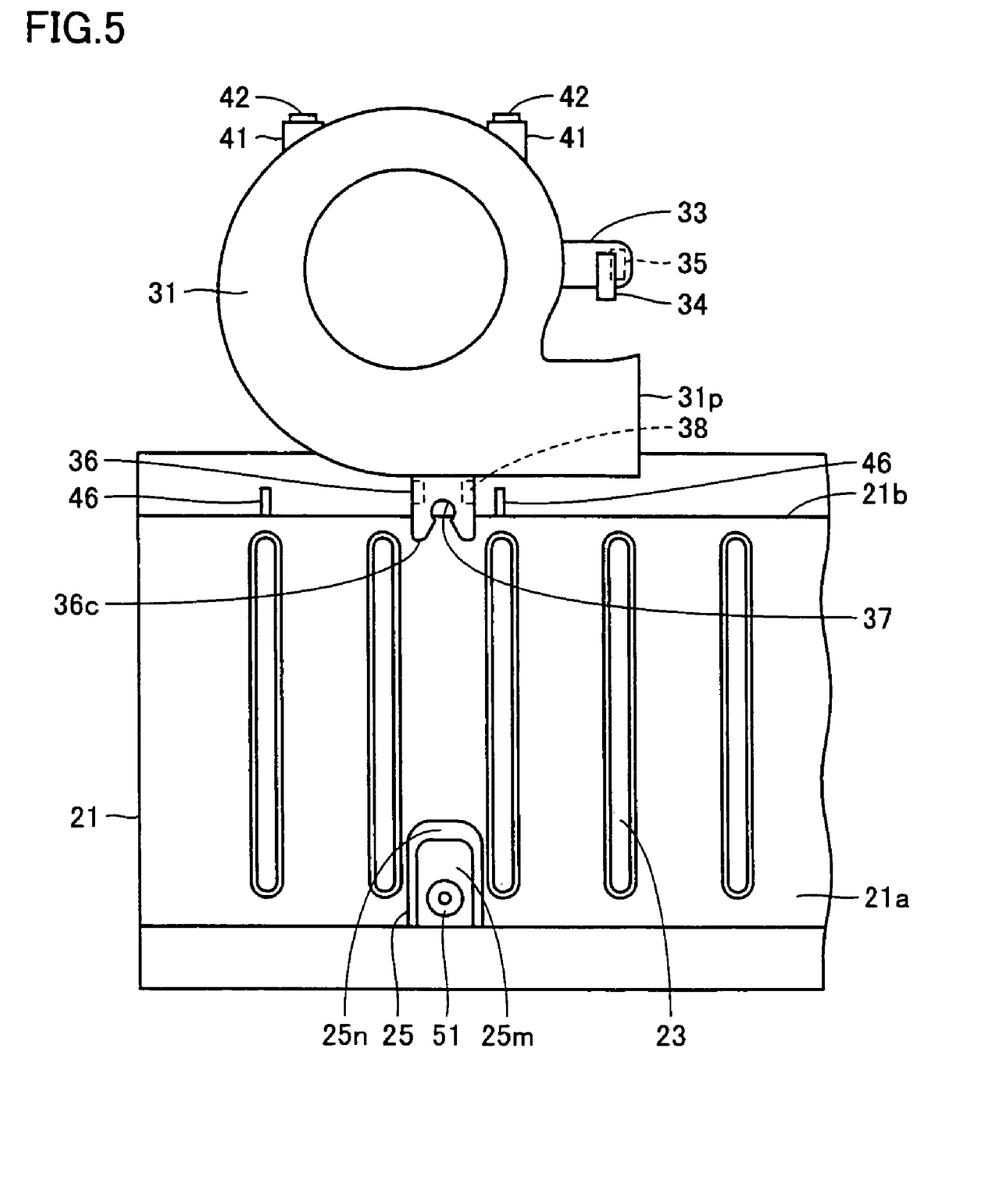
FIG. 5 is a plan view of the battery pack showing a first step of installing the battery cooling fan on the battery case in FIG. 2.
Figure 6:
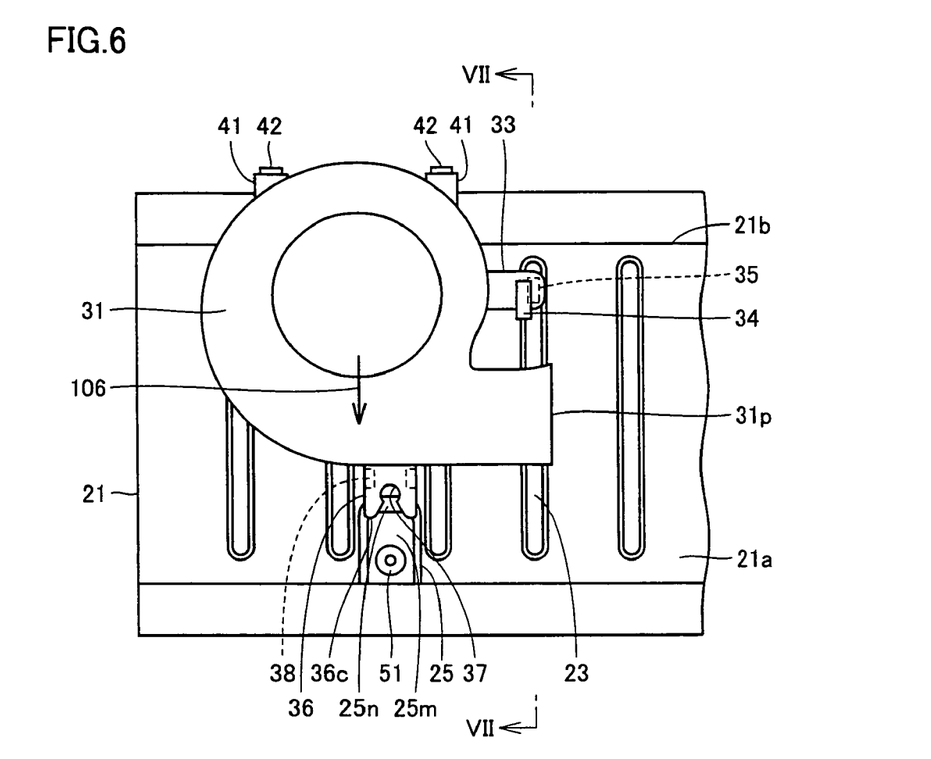
FIG. 6 is a plan view of the battery pack showing a second step of installing the battery cooling fan on the battery case in FIG. 2.
Figure 7:
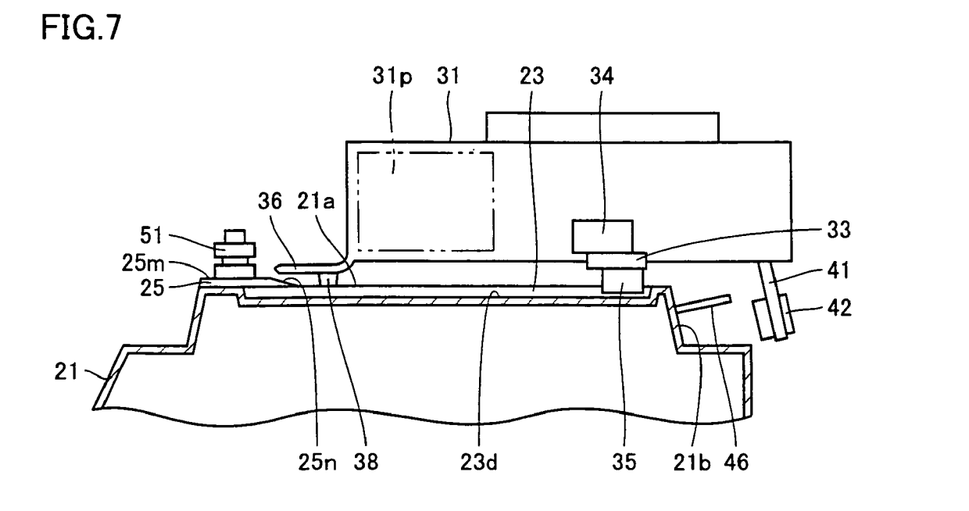
FIG. 7 is a cross-sectional view of the battery pack taken along the line VII-VII in FIG. 6.

FIGS. 5 and 6 are plan views of battery packs showing steps of installing the battery cooling fan on the battery case in FIG. 2. FIG. 7 is a cross-sectional view of the battery pack taken along the line VII-VII in FIG. 6.

Referring to FIG. 5, battery cooling fan 31 is carried through opening 201h into luggage room 201. Battery cooling fan 31 is placed on battery case 21 so that guide 35 rests on top surface 21a before groove 23 and guides 38 rest on top surface 21a before mount portion 25.

Referring to FIGS. 6 and 7, with the weight of battery cooling fan 31 being supported on battery case 21, battery cooling fan 31 is slid on top surface 21a from the rear to the front of the vehicle as shown by an arrow 106. During this sliding movement, guide 35 fits into groove 23. Guide 35 moves along groove 23 and guides 38 slide on top surface 21a. The fit between guide 35 and groove 23 causes the direction in which battery cooling fan 31 is traveling to be restricted. Thus, battery cooling fan 31 is guided to the prescribed installation position in the width direction of the vehicle on top surface 21a.

Figure 8:
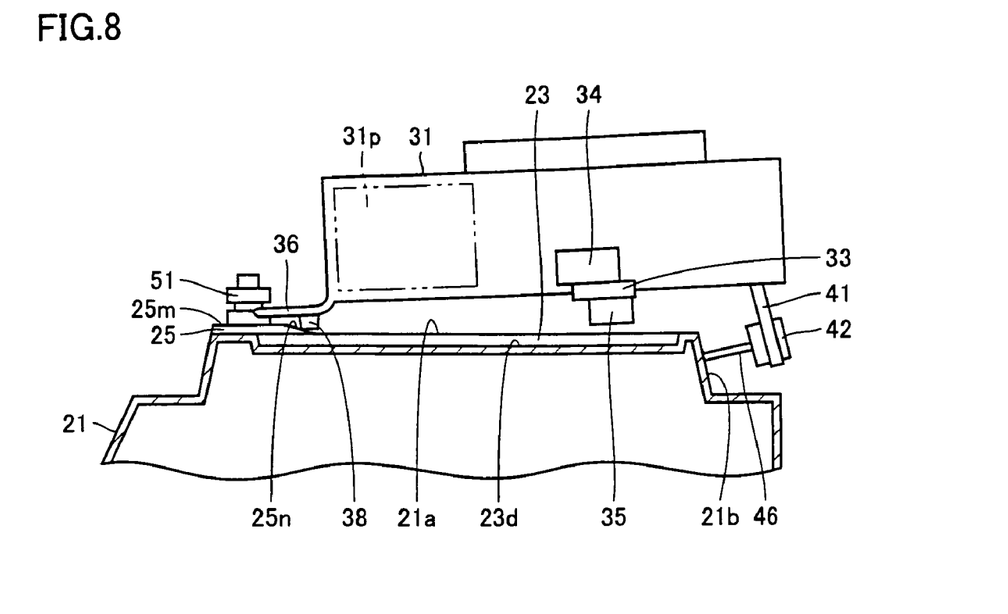
FIG. 8 is a cross-sectional view of the battery pack showing a third step of installing the battery cooling fan on the battery case in FIG. 2.

FIG. 8 is a cross-sectional view of the battery pack showing a step of installing the battery cooling fan on the battery case, following the step shown in FIGS. 6 and 7. Referring to FIG. 8, battery cooling fan 31 is slid further forward of the vehicle. Guides 38 slide on oblique surface 25n of mount portion 25 to reach top surface 25m. In the above-described manner, battery cooling fan 31 is guided to the prescribed installation position in the vertical direction on top surface 21a.

Referring to FIG. 3, stay 36 is inserted into rubber mount 51 and stays 41 are fixed to stud bolts 46. By the above-described steps, battery cooling fan 31 is installed on battery case 21.

The structure for installing the fan according to the first embodiment of the present invention includes battery case 21 qualified as an installation portion having top surface 21a qualified as a surface and provided to the vehicle, and battery cooling fan 31 qualified as an electrical part which is installed at the prescribed position on top surface 21a. At least one of battery case 21 and battery cooling fan 31 has guide 35, grooves 23 and guides 38 qualified as a guide member which guides battery cooling fan 31 toward the prescribed position while battery cooling fan 31 is slid on top surface 21a.

The guide member includes guide 35 and groove 23 qualified as a first guide portion which guides battery cooling fan 31 toward the prescribed position along the horizontal direction, and guides 38 qualified as a second guide portion which guides battery cooling fan 31 toward the prescribed position along the vertical direction.

A method for installing the fan according to the first embodiment of the present invention is a method for installing battery cooling fan 31 qualified as an electrical part on battery case 21 qualified as an installation portion. The method for installing the fan includes the steps of setting battery cooling fan 31 on top surface 21a qualified as a surface, and sliding battery cooling fan 31 on top surface 21a while battery cooling fan 31 is guided toward the prescribed position by guide 35, grooves 23 and guides 38 qualified as a guide member.

By the structure for installing the fan according to the first embodiment of the present invention which is configured in the above-described manner, battery cooling fan 31 can easily and precisely be guided to the prescribed installation position on top surface 21a by means of the fit between guide 35 and groove 23 as well as guides 38. Therefore, the operation for installing battery cooling fan 31 can easily be carried out. In particular, as with the present embodiment, in the case of attempting to install battery cooling fan 31 on battery case 21 which is placed in luggage room 201, the installation operation is required to be carried out in a narrow space. Also, the installation operation is carried out from the outside of the vehicle through opening 201h. Therefore, operators are far from the installation position of battery cooling fan 31. Even in this case, by the structure for installing the fan according to the present embodiment, the operation for installing battery cooling fan 31 can easily be carried out.

Although grooves 23 are formed in battery case 21 and guide 35 qualified as a protrusion is formed in battery cooling fan 31 in the present embodiment, a protrusion may be formed in battery case 21 and a groove may be formed in battery cooling fan 31. In this case, for example, a projection projecting from top surface 21a and extending in the backward and forward direction of the vehicle is formed in battery case 21. A groove which fits on the projection is formed in stay 33 of battery cooling fan 31. Furthermore, the guide member is not limited to the fit between a protrusion and a recess. The guide member may be formed of, for example, a rail and a wheel which moves on the rail.

Although the present embodiment has been described based on a structure in which battery pack 20 is arranged in luggage room 201, the present invention is not limited thereto. Battery pack 20 may be arranged, for example, under the front seat or rear seat, under a center console placed between the drivers' seat and passenger seat at the front seat, or the like. In the case where the vehicle has three rows of seats, battery pack 20 may be arranged under the second seat or the third seat.

The electrical part is not limited to a fan. It may be, for example, an inverter, or a junction box equipped with a relay for controlling a high-voltage circuit of a secondary battery or the like. It may also be a battery case which houses a secondary battery.

The vehicle to which the present invention is applied is not limited to a FR car. It may be a FF (Front engine Front wheel drive) car or a 4WD (Wheel Drive) car.

The present invention is also applicable to a FCHV (Fuel Cell Hybrid Vehicle) powered by a fuel cell and a secondary battery, or an EV (Electric Vehicle). In the hybrid vehicle of the present embodiment, an internal combustion engine is driven at an operating point of optimum fuel efficiency, whereas in the FCHV, a fuel cell is driven at an operating point of optimum electric power generation efficiency. A secondary battery is used in both hybrid vehicles in basically the same manner.

Second Embodiment

Figure 9:
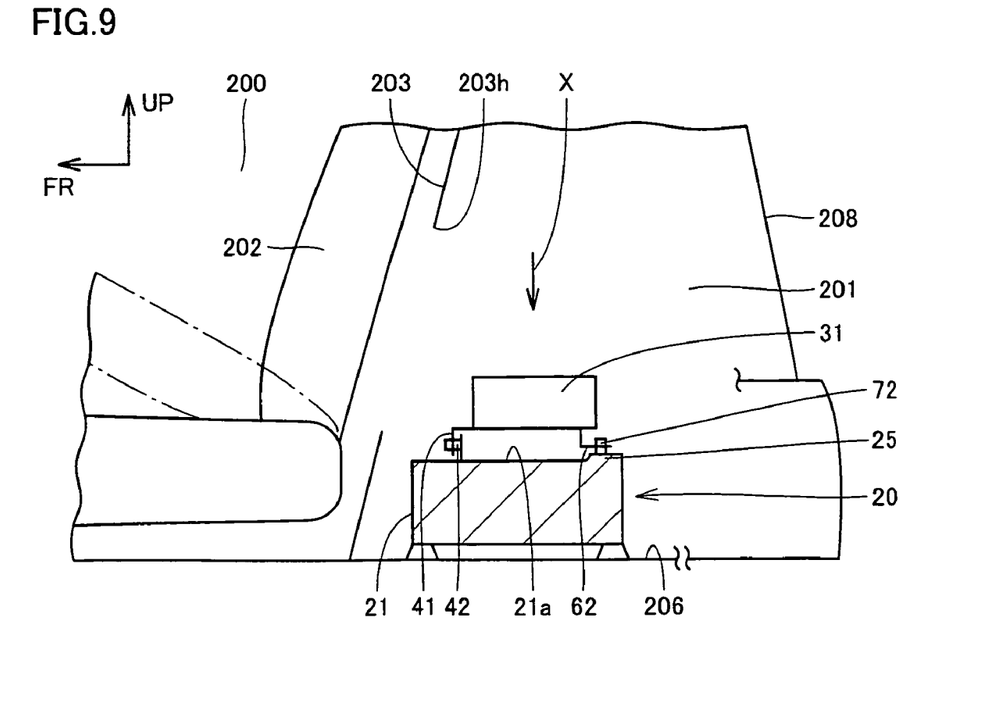
FIG. 9 is a cross-sectional view of a vehicle to which a structure for installing a fan according to a second embodiment of the present invention is applied.

FIG. 9 is a cross-sectional view of a vehicle to which a structure for installing a fan according to a second embodiment of the present invention is applied. FIG. 9 corresponds to FIG. 1 in the first embodiment. The structure for installing the fan according to the present embodiment has basically the similar structure in comparison with the structure for installing the fan according to the first embodiment. Hereinafter, the description of the same structure will not be repeated.

Referring to FIG. 9, in the present embodiment, a retractable rear seat 202 is placed in vehicle cabin 200. A communicating hole 203h which allows vehicle cabin 200 and luggage room 201 to communicate is formed in partition panel 203. Communicating hole 203h is used when long luggage such as a ski or the like is tilted and loaded from luggage room 201 to vehicle cabin 200 with rear seat 202 being folded forward.

Figure 10:
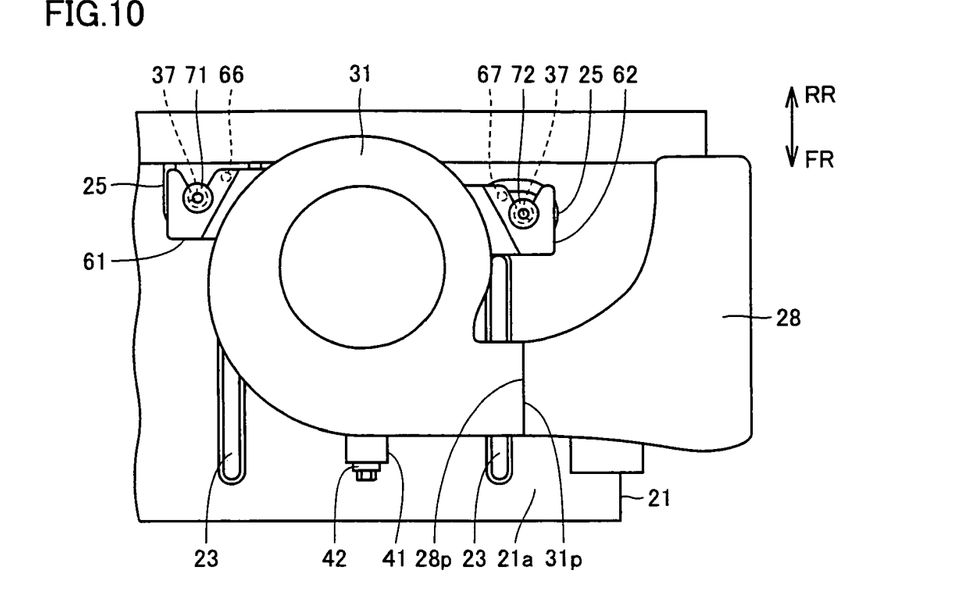
FIG. 10 is a top view of a battery pack as seen from the direction shown by an arrow X in FIG. 9.

FIG. 10 is a top view of a battery pack as seen from the direction shown by an arrow X in FIG. 9. Referring to FIG. 10, rubber mounts 71 and 72 are fixed to battery case 21 in place of rubber mount 51 shown in FIG. 1. Rubber mounts 71 and 72 are arranged on the rear side of the vehicle on top surface 21a with a spacing therebetween in the width direction of the vehicle. Battery cooling fan 31 has stays 61 and 62 in place of stay 36 shown in FIG. 1. Stays 61 and 62 are respectively fixed to rubber mounts 71 and 72. Furthermore, battery cooling fan 31 is fixed to battery case 21 via rubber mount 42 on the front side of the vehicle on top surface 21a.

Figure 11:
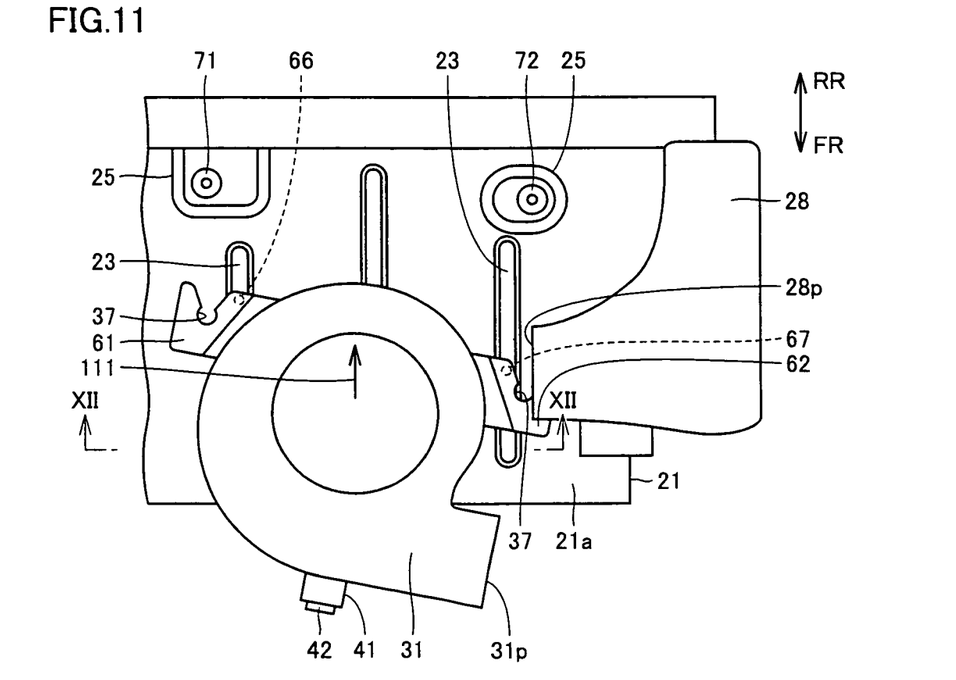
FIG. 11 is a plan view of the battery pack showing a step of installing the battery cooling fan on the battery case in FIG. 10.
Figure 12:
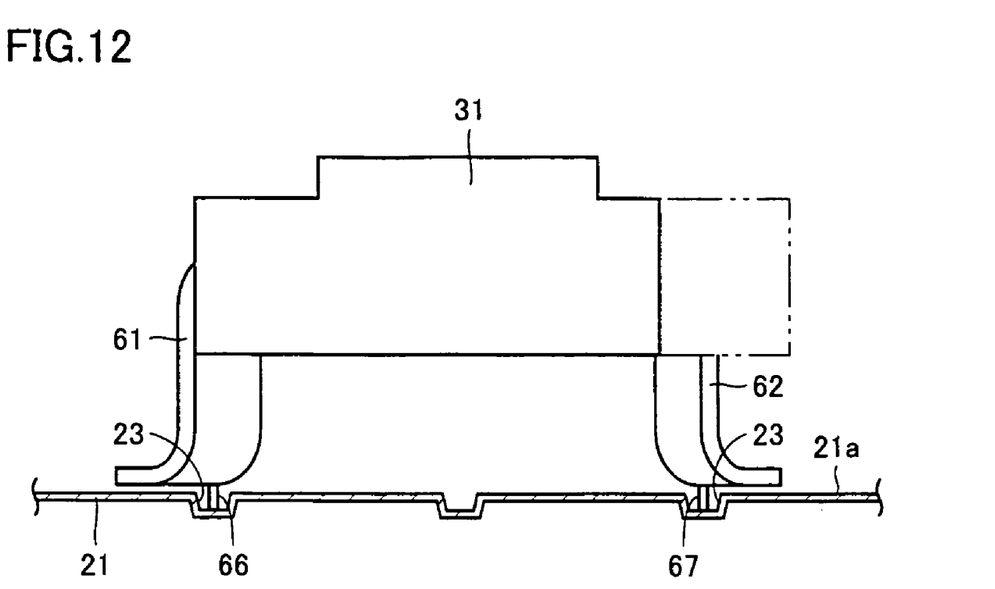
FIG. 12 is a cross-sectional view of the battery pack taken along the line XII-XII in FIG. 11.

FIG. 11 is a plan view of the battery pack showing a step of installing the battery cooling fan on the battery case in FIG. 10. FIG. 12 is a cross-sectional view of the battery pack taken along the line XII-XI in FIG. 11.

Referring to FIGS. 11 and 12, guides 66 and 67 are formed at stays 61 and 62 respectively. Guides 66 and 67 are formed in the similar manner to guide 35 in the first embodiment.

In the present embodiment, battery cooling fan 31 is carried from vehicle cabin 200 into luggage room 201 through communicating hole 203h formed in partition panel 203. Battery cooling fan 31 is slid on top surface 21a from the front to the rear of the vehicle as shown by an arrow 111. During this sliding movement, guides 66 and 67 fit into grooves 23 and move along grooves 23. The fit between guides 66 and 67 and grooves 23 causes the direction in which battery cooling fan 31 is traveling to be restricted. Thus, battery cooling fan 31 is guided to the prescribed installation position on top surface 21a.

By the structure for installing the fan according to the second embodiment of the present invention which is configured in the above-described manner, the similar advantages to that described in the first embodiment can be offered.

It should be noted that each variation described in the first embodiment may be applied to the structure for installing the fan according to the second embodiment as appropriate.

It should be understood that the embodiments disclosed herein are illustrative and not limitative in any respect. The scope of the present invention is defined by the terms of the claims, rather than the embodiments and examples above, and is intended to include any modifications within the scope and meaning equivalent to the terms of the claims.

INDUSTRIAL APPLICABILITY

The present invention is primarily applied to a structure for installing an electrical part to be mounted on a vehicle.

The invention claimed is:

1. A structure for installing an electrical part, comprising:
an installation portion having a surface, the installation portion being provided on a vehicle;
an electrical part attached at a prescribed position on the surface of the installation portion during use; and
a guide member provided on the electrical part which guides the electrical part toward the prescribed position while the electrical part is slid on the surface of the installation portion;
wherein the guide member has no contact with the installation portion when the electrical part is attached at the prescribed position; and
the guide member is arranged farther away from the installation portion when the electrical part is attached at the prescribed position than while the electrical part is slid on the surface of the installation portion;
wherein the guide member includes a protrusion formed on the electrical part to fit into a groove formed on the installation portion
wherein the guide member includes a protrusion formed on the electrical part to fit into a groove formed on the installation portion, wherein the protrusion is spaced apart from a bottom surface of the groove.

2. The structure for installing an electrical part according to claim 1, wherein said installation portion is a housing of an electric storage device mounted on the vehicle.

3. The structure for installing an electrical part according to claim 1, wherein said guide member includes a first guide portion guiding said electrical part toward said prescribed position along the horizontal direction, and a second guide portion guiding said electrical part toward said prescribed position along the vertical direction.

4. The structure for installing an electrical part according to claim 1, wherein said installation portion has a receiving portion, said electrical part has an inserting portion, and said receiving portion and said inserting portion are fit on each other by sliding said electrical part on said surface.

5. The structure for installing an electrical part according to claim 1, wherein said electrical part is a fan.

6. The structure for installing an electrical part according to claim 1, wherein the installation portion is a housing of an electric storage device mounted in a luggage room, the electrical part is a fan by which cooling air is fed into the electric storage device, and the fan is fixed to the housing by being carried in from an opening of the luggage room which is open to the longitudinal direction of the vehicle, and being slid in the lateral direction of the vehicle.

7. A structure for installing an electrical part, comprising:

an installation portion provided on a vehicle;

an electrical part mounted at a prescribed position above a surface on the installation portion; and a first guide member and a second guide member provided on the electrical part, said first guide member for guiding the electrical part toward the prescribed position along a horizontal direction, and said second guide member for guiding the electrical part toward the prescribed position along a vertical direction;

wherein the first guide member and the second guide member have no contact with the surface of the installation portion when the electrical part is mounted at the prescribed position, wherein said second guide member is a stay comprising two arms extending on either side of a central hole, wherein the surface is a top surface and the installation portion further comprises a raised mount portion extending from the top surface, said raised mount portion comprising a rubber mount having a groove adapted to receive the two arms therein.

8. The structure for installing an electrical part according to claim 7, wherein said first guide member is a protrusion on a lower surface of the electrical part and said installation portion comprises a groove in a top surface adapted to receive the protrusion therein.

9. The structure for installing an electrical part according to claim 7, further comprising an oblique surface extending from the top surface of the installation part to the raised mount portion.

\* \* \* \* \*